UNITED STATES PATENT OFFICE.

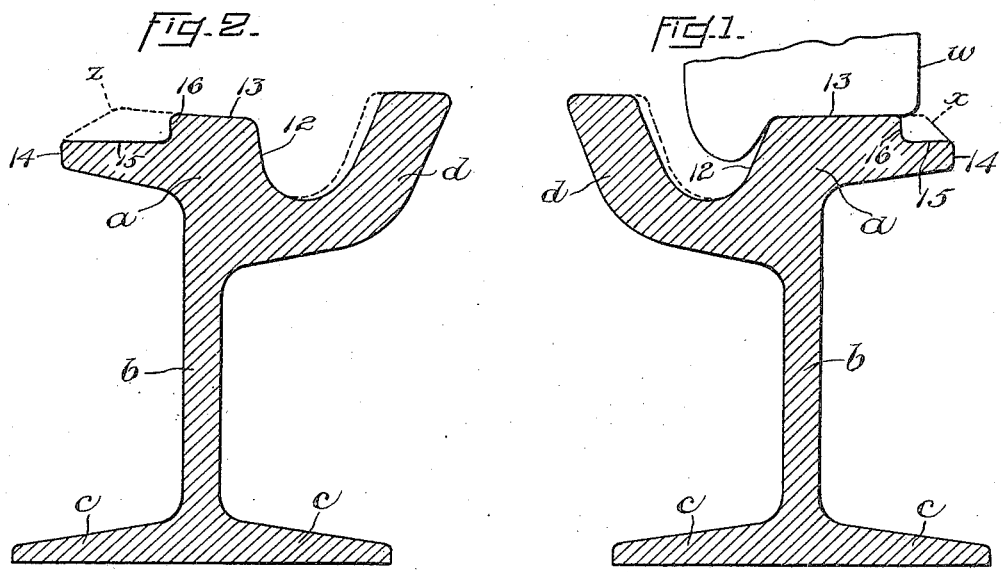

JOHN WILLIAM McMANAMA, OF WALTHAM, MASSACHUSETTS, ASSIGNOR OF ONE-THIRD TO SAMUEL W. SIMONDS AND ONE-THIRD TO FRANCIS A. BARBEY, BOTH OF CAMBRIDGE, MASSACHUSETTS.

STREET-RAILROAD RAIL.

1,343,001. Specification of Letters Patent. Patented June 8, 1920.

Application filed November 15, 1917, Serial No. 202,224. Renewed November 17, 1919. Serial No. 338,529.

*To all whom it may concern:*

Be it known that I, JOHN W. McMANAMA, a citizen of the United States, residing at Waltham, in the county of Middlesex and State of Massachusetts, have invented new and useful Improvements in Street-Railroad Rails, of which the following is a specification.

This invention relates to curved and tangent rails of street railroads, and has for its chief object to so improve the form of such rails as to prevent the formation of shoulders on their tread faces, and an increase of the width of said faces by the wearing action of car wheels thereon.

Another object of the invention is to prevent wearing contact of wheel flanges with the inner sides of the grooves formed by flange guards on the rails adjacent to the tread faces thereof.

The invention is embodied in the improvements which I will now proceed to describe and claim.

Of the accompanying drawings forming a part of this specification,—

Figure 1 is a transverse section of a rail embodying the invention, this rail when forming a member of a track curve, being the outside rail.

Fig. 2 is a transverse section of the inner rail of a track curve, said rail embodying the invention.

The drawings represent one-half of the actual size of the rail.

The same reference characters indicate the same parts in all of the figures.

*a* represents the head, *b* the web, and *c, c* the foot of a street railroad rail of the girder type. *d* represents the wheel flange guard formed at one side of the head.

My improvements hereinafter described relate to the form of the head and wheel flange guard, the form of the web and foot being as usual.

The head *a* is of standard width and has a lateral face 12 forming a wheel-flange bearing and defining one edge of the tread face 13. The head has also an opposite lateral abutment face 14, forming an abutment or stop for paving or road material.

The head is rabbeted to form a relatively wide substantially horizontal top face 15, extending inwardly from the abutment 14, and depressed below the tread face 13, and a relatively narrow substantially vertical lateral face 16 defining the opposite edge of the tread face 13.

The lateral tread-defining face 16 is so spaced from the abutment 14, and from the flange-bearing face 12, that the width of the tread face is less than that of the tread face of a standard rail, and less than the width of the tread of any car wheel *w*. Street car wheels vary considerably in the width of their treads, the narrowest tread being about two and one-half inches wide, as indicated by Fig. 1. The maximum width of the tread 13 of my improved rail is about two inches, so that the wearing action of any wheel is distributed entirely across the tread face, and hence the wheel cannot wear a shoulder on the tread face.

The tread-defining face 16 is perpendicular to the tread face, so that the width of the tread face is practically unchanged by its reduction in height due to wear. Heretofore the head *a* has been formed with a relatively wide tread face and with an inclined face indicated by the dotted line *x*, said face sloping from the tread face 13 to the abutment face 14. When the tread face 13 is worn down by relatively wide wheel treads running thereon, the width of the tread face 13 is gradually increased as it is worn down. When the width of the tread face 13 becomes equal to that of the narrowest wheel tread, the outer edges of the wheel treads gradually form a shoulder in the portion of the head indicated by the dotted line *x*. This shoulder is objectionable, because it involves increased wear of the outer edge portions of the wheel treads and increased frictional resistance to the rotation of the wheels, particularly when the rail is curved and forms a member of a track curve.

An increase of the width of the tread face 13 is also objectionable in track curves which include an outer rail having a relatively wide tread face, as shown by Fig. 1, and an inner rail having a narrower tread face, as shown by Fig. 2, the maintenance of a uniform relation between the width of the relatively wide tread of the outside rail and that of the relatively narrow tread of the inside rail being important, for reasons indicated by Letters Patent 1,006,579, dated October 24, 1911, and 1,239,927, dated September 11, 1917, and briefly stated as follows: When the head of the inner rail has a tread surface of substantially the same width as the tread surface of the outer rail, in accordance with the usual practice, the wheel flanges are so pressed against the flange-bearing of the outer curved rail that not only is considerable power lost, but also the flange-bearing of the outer rail is worn or ground away at an objectionably rapid rate, such wear rendering the outer rail useless in a relatively short period.

I have discovered that by reducing the width of the tread face of the inner rail without altering the gage, or the distance between the flange-bearings of the two rails, the frictional resistance to the movement of the wheels over the curve, and the loss of power due thereto, are greatly reduced, the wear of the flange-bearing of the outer rail is correspondingly reduced and the life of said rail is correspondingly increased. These results I believe to be due to the decreased traction of the wheels on the inner rail and the correspondingly increased freedom of the wheels to slip laterally on the tread face of the inner rail in the direction required to greatly diminish or prevent grinding contact of the wheel flanges with the flange-bearing of the outer rail.

The outer side of the wheel flange guard $d$ forms an inner abutment for paving or road material and is spaced from the outer abutment formed by the face 14 as in rails of standard width.

The inner side of the flange guard $d$ forms one side of the usual wheel flange-receiving groove, the opposite side of which is formed by the flange bearing 12.

To prevent or reduce the liability of wearing contact between the flange guard $d$ and wheel flanges running in said groove, I reduce the thickness of the flange guard from the standard thickness shown by full and dotted lines, the dotted line $y$ indicating the inner side of the guard of a standard rail, to the thickness shown entirely by full lines. The width of the flange-receiving groove is therefore increased for the purpose stated, without an increase of the width of the rail. The face 15 of the inside rail shown by Fig. 2, is wider than the face 15 of the outside rail shown by Fig. 1, so that while the width of the head of the inside rail between the outer abutment 14 and the flange bearing 12 is the same in both rails, the width of the tread face 13 of the inner rail is materially reduced, the extent of the reduction being indicated in Fig. 2, by the dotted line $z$.

It will now be seen that my invention is useful whether embodied in a tangent rail or in the outside and inside rails of a track curve.

I claim—

1. A street railway rail the head of which is of standard width, one lateral face of the head forming a wheel-flange-bearing defining one edge of the tread face, while the opposite lateral face forms a pavement abutment, the head being rabbeted to form a relatively wide substantially horizontal top face extending inwardly from said abutment and depressed below the tread face, and a relatively narrow tread-defining lateral face substantially perpendicular to the tread face and defining the opposite edge of the latter, said perpendicular face being spaced from the said flange bearing to render the tread face narrower than a wheel tread of minimum width, whereby wear of the tread face is distributed entirely across the same, the perpendicularity of said tread-defining face preventing change of the width of the tread face by wear.

2. A street railway rail the head of which is of standard width, one lateral face of the head forming a wheel-flange-bearing defining one edge of the tread face, while the opposite lateral face forms an outer pavement abutment, the head being rabbeted to form a relatively wide substantially horizontal top face extending inwardly from said abutment and depressed below the tread face, and a relatively narrow tread-defining lateral face substantially perpendicular to the tread face, and defining the opposite edge of the latter, said perpendicular face being spaced from the said flange bearing to render the tread face narrower than a wheel tread of minimum width, whereby wear of the tread face is distributed entirely across the same, the perpendicularity of said tread-defining face preventing change of the width of the tread face by wear, the head being provided with a wheel-flange guard the inner side of which faces the said wheel-flange bearing and forms therewith a wheel-flange-receiving groove, while the outer side forms an inner pavement abutment spaced from said outer abutment as in a rail of standard width, the said flange guard being reduced in thickness to increase the width of said groove and prevent contact of wheel flanges with the inner side of said guard.

3. A street railroad track curve comprising an outside rail and an inside rail, each having a head of standard width, one lateral face of the head forming a wheel-flange-bearing defining one edge of the tread face, while the opposite lateral face forms a pavement abutment or stop, the head being rabbeted to form a relatively wide substantially horizontal top face extending inwardly from said abutment and depressed below the tread face, and a relatively narrow tread-defining lateral face substantially perpendicular to the tread face, and defining the opposite edge of the latter, said perpendicular face being spaced from the said flange bearing to render the tread face narrower than a wheel tread of minimum width, the heads of the two rails being of substantially the same width, and the tread face of the inside rail being narrower than the tread face of the outside rail.

In testimony whereof I have affixed my signature.

JOHN WILLIAM McMANAMA.